(12) United States Patent
Watson et al.

(10) Patent No.: US 9,766,783 B2
(45) Date of Patent: Sep. 19, 2017

(54) DISPLAYING AGGREGATED SOCIAL NETWORKING SYSTEM USER INFORMATION VIA A MAP INTERFACE

(71) Applicants: Thomas Andrew Watson, San Francisco, CA (US); Jonathan McCord, Mountain View, CA (US); Justin Alexander Shaffer, Menlo Park, CA (US); Ross David Bayer, Mountain View, CA (US)

(72) Inventors: Thomas Andrew Watson, San Francisco, CA (US); Jonathan McCord, Mountain View, CA (US); Justin Alexander Shaffer, Menlo Park, CA (US); Ross David Bayer, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 738 days.

(21) Appl. No.: 13/623,483

(22) Filed: Sep. 20, 2012

(65) Prior Publication Data
US 2014/0082505 A1 Mar. 20, 2014

(51) Int. Cl.
*G06F 3/0484* (2013.01)
*G06Q 50/00* (2012.01)

(52) U.S. Cl.
CPC ........... *G06F 3/0484* (2013.01); *G06Q 50/01* (2013.01)

(58) Field of Classification Search
CPC .............................. G06F 3/0484; G06Q 50/01
See application file for complete search history.

(56) References Cited

U.S. PATENT DOCUMENTS

| | | | |
|---|---|---|---|
| 6,266,649 B1 * | 7/2001 | Linden et al. | 705/7.29 |
| 6,608,615 B1 | 8/2003 | Martins | |
| 6,996,782 B2 | 2/2006 | Parker et al. | |
| 7,574,530 B2 | 8/2009 | Wang et al. | |
| 7,669,123 B2 | 2/2010 | Zuckerberg et al. | |
| 7,725,492 B2 | 5/2010 | Sittig et al. | |
| 7,797,256 B2 | 9/2010 | Zuckerberg et al. | |
| 7,827,208 B2 | 11/2010 | Bosworth et al. | |
| 7,925,991 B2 | 4/2011 | Ruckart et al. | |
| 8,099,433 B2 | 1/2012 | Sittig et al. | |

(Continued)

OTHER PUBLICATIONS

U.S. Appl. No. 13/239,347, filed Sep. 21, 2011.

(Continued)

*Primary Examiner* — Stephen Hong
*Assistant Examiner* — Hope C Sheffield
(74) *Attorney, Agent, or Firm* — Fenwick & West LLP

(57) ABSTRACT

A map interface presents a geographic map with markers identifying geographic locations associated with content items. When the geographic distance between two or more content items is less than a threshold distance, multiple content items are grouped to create an aggregated content item. Based on the geographic locations associated with the grouped content items, a geographic location is associated with the aggregated content item. A single marker identifies the geographic location for the aggregated content item on the geographic map. When a user viewing the map interface accesses the single marker, content selected from the content items combined to generated the aggregated content item is presented as well as the geographic location associated with the aggregated content item.

23 Claims, 5 Drawing Sheets

(56) References Cited

U.S. PATENT DOCUMENTS

| | | | |
|---|---|---|---|
| 8,171,128 B2 | 5/2012 | Zuckerberg et al. | |
| 8,306,922 B1 | 11/2012 | Kunal et al. | |
| 8,311,950 B1 | 11/2012 | Kunal et al. | |
| 8,356,248 B1 | 1/2013 | Killalea | |
| 8,468,083 B1 | 6/2013 | Szulczewski | |
| 8,533,175 B2 | 9/2013 | Roswell | |
| 8,543,586 B2 | 9/2013 | Glachant et al. | |
| 8,606,792 B1* | 12/2013 | Jackson | G06F 17/30699 707/748 |
| 8,612,517 B1 | 12/2013 | Yadid et al. | |
| 8,726,142 B2 | 5/2014 | Piantino et al. | |
| 8,832,560 B2 | 9/2014 | Yung et al. | |
| 9,448,682 B2 | 9/2016 | Yerli | |
| 9,515,891 B2 | 12/2016 | Ickman et al. | |
| 2004/0155903 A1 | 8/2004 | Schneeberg | |
| 2005/0091670 A1 | 4/2005 | Karatal et al. | |
| 2006/0106764 A1 | 5/2006 | Girgensohn et al. | |
| 2006/0168510 A1 | 7/2006 | Bryar et al. | |
| 2007/0011150 A1 | 1/2007 | Frank | |
| 2007/0150234 A1 | 6/2007 | Wicks | |
| 2007/0162322 A1 | 7/2007 | Shahine et al. | |
| 2007/0192299 A1 | 8/2007 | Zuckerberg et al. | |
| 2007/0214141 A1 | 9/2007 | Sittig et al. | |
| 2008/0033739 A1 | 2/2008 | Zuckerberg et al. | |
| 2008/0040474 A1 | 2/2008 | Zuckerberg et al. | |
| 2008/0154878 A1* | 6/2008 | Rose | G06F 17/30867 |
| 2008/0189292 A1 | 8/2008 | Stremel et al. | |
| 2008/0294663 A1 | 11/2008 | Heinley et al. | |
| 2009/0031245 A1 | 1/2009 | Brezina et al. | |
| 2009/0112467 A1 | 4/2009 | Jiang et al. | |
| 2009/0132953 A1 | 5/2009 | Reed et al. | |
| 2009/0169060 A1 | 7/2009 | Faenger et al. | |
| 2009/0208955 A1 | 8/2009 | Robins et al. | |
| 2009/0248599 A1* | 10/2009 | Hueter et al. | 706/20 |
| 2009/0249223 A1 | 10/2009 | Barsook et al. | |
| 2009/0265359 A1 | 10/2009 | Barsook et al. | |
| 2010/0076850 A1* | 3/2010 | Parekh et al. | 705/14.66 |
| 2010/0145936 A1 | 6/2010 | Grinstein et al. | |
| 2010/0198880 A1 | 8/2010 | Petersen | |
| 2010/0199192 A1 | 8/2010 | Sittig et al. | |
| 2010/0332330 A1 | 12/2010 | Goel et al. | |
| 2011/0021250 A1 | 1/2011 | Ickman et al. | |
| 2011/0022602 A1* | 1/2011 | Luo et al. | 707/748 |
| 2011/0029560 A1 | 2/2011 | Stremel et al. | |
| 2011/0029638 A1 | 2/2011 | Stremel et al. | |
| 2011/0066606 A1 | 3/2011 | Fox et al. | |
| 2011/0066941 A1 | 3/2011 | Chipchase et al. | |
| 2011/0078598 A1 | 3/2011 | Barak | |
| 2011/0161875 A1* | 6/2011 | Kankainen | 715/810 |
| 2011/0206283 A1 | 8/2011 | Quarfordt et al. | |
| 2012/0011103 A1 | 1/2012 | Joo et al. | |
| 2012/0017168 A1* | 1/2012 | Mason et al. | 715/781 |
| 2012/0047129 A1* | 2/2012 | Redstone et al. | 707/723 |
| 2012/0108274 A1 | 5/2012 | Acebo Ruiz et al. | |
| 2012/0124508 A1 | 5/2012 | Morin et al. | |
| 2012/0137224 A1 | 5/2012 | Carlsen et al. | |
| 2012/0158935 A1 | 6/2012 | Kishimoto et al. | |
| 2012/0166532 A1 | 6/2012 | Juan et al. | |
| 2012/0166971 A1 | 6/2012 | Sachson et al. | |
| 2012/0254225 A1 | 10/2012 | Carter et al. | |
| 2012/0266081 A1 | 10/2012 | Kao | |
| 2013/0024431 A1 | 1/2013 | Parthasarathy et al. | |
| 2013/0046771 A1 | 2/2013 | Moitra et al. | |
| 2013/0073970 A1 | 3/2013 | Piantino et al. | |
| 2013/0073971 A1 | 3/2013 | Huang et al. | |
| 2013/0073995 A1 | 3/2013 | Piantino et al. | |
| 2013/0159883 A1* | 6/2013 | Yerli | H04L 65/403 715/753 |

OTHER PUBLICATIONS

U.S. Appl. No. 13/239,348, filed Sep. 21, 2011.
U.S. Appl. No. 13/239,349, filed Sep. 21, 2011.
U.S. Appl. No. 13/239,351, filed Sep. 21, 2011.
U.S. Appl. No. 13/239,354, filed Sep. 21, 2011.
U.S. Appl. No. 13/239,355, filed Sep. 21, 2011.
U.S. Appl. No. 13/239,357, filed Sep. 21, 2011.
United States Office Action, U.S. Appl. No. 13/623,475, Sep. 3, 2015, 34 pages.
United States Office Action, U.S. Appl. No. 13/623,475, Feb. 13, 2015, 34 pages.
United States Office Action, U.S. Appl. No. 13/623,475, Jul. 18, 2014, 29 pages.
United States Notice of Allowance, U.S. Appl. No. 13/623,475, Jun. 23, 2016, 12 pages.

* cited by examiner

DISPLAYING AGGREGATED SOCIAL NETWORKING SYSTEM USER INFORMATION VIA A MAP INTERFACE

BACKGROUND

This invention relates generally to social networking and, in particular, to aggregating and displaying geographic information about users of a social networking system.

Social networking systems capture and store large volumes of information from various sources. Information stored by the social networking system will often be associated with a geographic location. When providing information about a user a social networking system may present a map interface including markers indicating geographic locations of different types of information pertaining to the user. For example, a map interface may present markers identifying geographic locations associated with photos of the user and comments posted by the user while at the marked geographic location.

However, as the social networking system accumulates more information about the user over time, it becomes difficult to read the information on the map interface. For example, the map interface may become cluttered as the system obtains and displays new information as the user adds new photos, friends, and other information associated with a location. Although viewers of a map interface may be able to discern one map marker from another, this will not always be the case. For example, viewers may wish to browse information about a user's visit to a particular location, but markers identifying the user's visits to other nearby locations may make it difficult to identify the marker corresponding to the particular location.

Furthermore, as a variety of information related to geographically close locations is captured in large volumes by the social networking system, aggregating the information into compact, yet information structures, allows viewers to more efficiently consume such information. In addition, information from a certain location often is related to other information from nearby locations, making it desirable to associate or display such information together. For example, it may be interesting for viewers to see photos of a user from his vacation in conjunction with that user's status updates from the same vacation. However, if the map interface displays information segmented by individual map markers at geographically close locations, viewers wishing to view the user's overall vacation information are forced to individually identify map markers to retrieve information. This makes it difficult to concurrently view different types of information related to a particular location.

SUMMARY

A map interface may be used to identify geographic locations associated with content items. For example, a map interface associated with a social networking system user identifies geographic locations associated with content items that are associated with the social networking system. The map interface may display a marker on a geographic map to identify the geographic location associated with one or more content items. However, a zoom level associated with the map interface may be modified to increase or decrease the scale of the map interface. Modifying the zoom level often reduces the distance between the markers displayed by the map interface. As the distance between the markers displayed by the map interface is reduced, it becomes more difficult for a user viewing the map interface to select specific markers, making it difficult for the viewing user to access the content items associated with geographic locations identified by different markers.

To allow a viewing user to more easily retrieve content items associated with different geographic locations from the map interface, content items may be combined to generate an aggregated content item. A geographic location is associated with the aggregated content item and a marker is displayed on the map interface identifying the geographic location associated with the aggregated content item. To generate an aggregated content item, a plurality of initial content items, each associated with a geographic location, is accessed. A threshold distance is determined based on the zoom level used to present the map interface. A pair of content items associated with the geographic locations that are closest to each other is selected form the initial content items. The distance between the geographic locations associated with the selected pair of content items is compared to the threshold distance, and if the distance is less than or equal to the threshold distance, an aggregated content item is generated that includes both of the selected pair of content items. Based on the geographic locations associated with the selected pair of content items, a geographic location is determined and associated with the aggregated content item.

Various factors may be used to determine the geographic location associated with the aggregated content item. For example, the geographic location associated with the aggregated content item is based on a weighted average of the geographic locations associated with the pair of content items. The weights may be based in part on a time associated with each content item in the pair of content item, affinities of a viewing user for each of the content items in the pair of content items, or any other suitable criteria or combination of criteria. Alternatively, the geographic location associated with the aggregated content item may be determined as the geographic midpoint between the geographic locations of the selected pair of content items.

In one embodiment, pairs of content items, including aggregated content items, are selected and continue to be aggregated until the shortest distance between geographic locations associated with a pair of content items is larger than the threshold distance. A map interface including one or more aggregated content items, or markers identifying a geographic location associated with an aggregated content item, is sent for display to a viewing user. Markers identifying one or more geographic locations associated with an initial content item may also be displayed via the map interface. By accessing an aggregated content item via the map interface, a viewing user receives information describing one or more of the content items combined to form the aggregated content item, allowing the viewing user to access various content items via the aggregated content item.

An information display may be presented when the viewing user interacts with a marker identifying a geographic location associated with an aggregated content item. The information display presents one or more content items included in the aggregated content item and identifies the geographic location associated with the aggregated content item. In one embodiment, the content items from the aggregated content item presented by the information display are randomly selected. Alternatively, content items may be selected from the aggregated content item based on factors such as the viewing user's affinity for the content items comprising the aggregated content item, times associated with the content items comprising the aggregated content item or other suitable information. Additionally, the information display may present content items in an order that is determined by criteria such as recency or viewing user's affinity so that the presented content items are those in which the viewing user is likely to have an interest. Further, the information display may modify the specificity with which the geographic location associated with the aggregated content item is presented based on the zoom level used to present the map interface. For example, the level of detail used to describe the geographic location associated with the aggregated content item increases proportional to the zoom level, so that more detail is used to describe the geographic location associated with the aggregated content item when the map interface is viewed with a high degree of detail.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system gathers and stores content items of narrative data about a user of the social networking system, including personal information and social networking activities related to the user that are associated with a geographic location. A marker is associated with one or more of the content items and displayed on a map interface to identify the geographic location associated with one or more of the content items. Multiple markers identifying different geographic locations associated with various content items may be displayed on the map interface. When content items are associated with geographic locations within a threshold distance, an aggregated content item is generated and associated with a geographic location determined from the geographic locations associated with the content items used to generate the geographic locations. A single marker is displayed on the map interface identifying the location associated with the aggregated content item. The threshold distance for generating an aggregated content item may depend on a zoom level used to display the map interface.

In one embodiment, the single marker indicates the number of content items used to generate the aggregated content item associated with the single marker. For example, a number is displayed in or proximate to the single marker on the map interface. When a user viewing the map interface interacts with a marker associated with an aggregated content item, information describing the content items used to generate the aggregated content items is displayed. For example, if a user places a cursor over a marker associated with an aggregated content item, a window displaying information describing the content items used to generate the aggregated content item is displayed. Examples of information describing content items include the name of a geographic location associated with the content items, an image associate with one or more of the content items, or other narrative data about the user.

System Architecture

Figure 1:
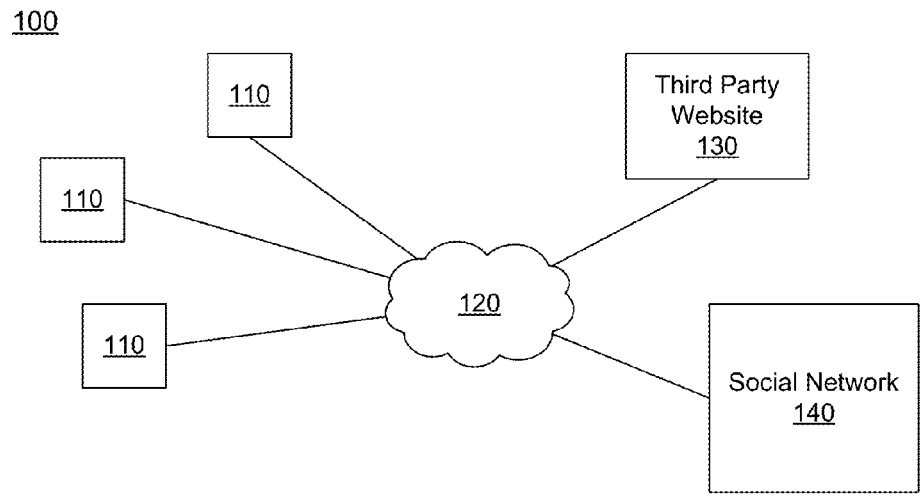
FIG. 1 is a block diagram of a system environment in which a social networking system operates, in accordance with an embodiment of the invention.

FIG. 1 is a high level block diagram illustrating a system environment 100 for a social networking system 140. The system environment 100 comprises one or more client devices 110, a network 120, one or more third-party web-sites 130 and the social networking system 140. In alternative configurations, different and/or additional components may be included in the system environment 100. The embodiments described herein can be adapted to online systems that are not social networking systems.

The client devices 110 comprise one or more computing devices capable of receiving user input as well as transmitting and/or receiving data via the network 120. In one embodiment, a client device 110 is a conventional computer system, such as a desktop or laptop computer. In another embodiment, a client device 110 may be a device having computer functionality, such as a personal digital assistant (PDA), mobile telephone, smart-phone or similar device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) that runs on the native operating system of the client device 110, such as IOS® or ANDROID™.

The client devices 110 are configured to communicate via the network 120, which may comprise any combination of local area and/or wide area networks, using both wired and wireless communication systems. In one embodiment, the network 120 uses standard communications technologies and/or protocols. Thus, the network 120 may include links using technologies such as Ethernet, 802.11, worldwide interoperability for microwave access (WiMAX), 3G, 4G, CDMA, digital subscriber line (DSL), etc. Similarly, the networking protocols used on the network 120 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 120 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec). The third party website 130 may be coupled to the network 120 for communicating with the social networking system 140, which is further described below in conjunction with FIG. 2.

The social networking system 140 allows users to view data about other users of the social networking system 140. This data may be presented to viewers via a map interface that integrates and represents content items associated with a user by identifying geographic locations associated with content items on a map interface. For example, markers are displayed on the map interface to identify geographic locations associated with content items. A marker may be associated with a single content item or with multiple content items associated with a common location. For example, photos, comments and status updates from a particular geographic location may be represented by a single marker identifying the geographic location. As further described below, the map interface may present a viewer with information about a single subject user, or two or more subject users simultaneously.

Figure 2:
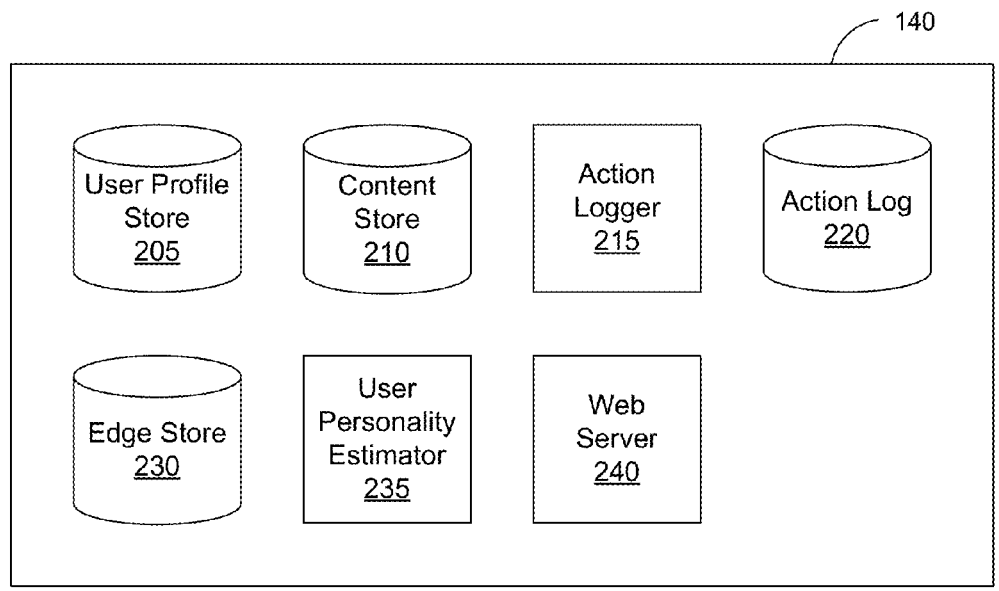
FIG. 2 is a block diagram of a social networking system, in accordance with an embodiment of the invention.

FIG. 2 is an example block diagram of an architecture of the social networking system 140. The social networking system 140 includes a user profile store 205, a content store 210, an action logger 215, an action log 220, an edge store 230, an interface generator 235, and a web server 240. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user, and may also include profile information inferred by the social networking system 140. In one embodiment, a user profile includes multiple data fields, each data field describing one or more attributes of the corresponding user of the social networking system 140. The user profile information stored in user profile store 205 describes the users of the social networking system 140, including biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 140 displayed in an image. A user profile in the user profile store 205 may also maintain references to actions by the corresponding user performed on content items in the content store 210 and stored in the action log 220.

While user profiles in the user profile store 205 are frequently associated with individuals, allowing people to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects representing various types of content. Examples of content represented by an object include a page post, a status update, a photo, a video, a link, a shared content item, a gaming application achievement, a check-in event at a local business, a brand page, or any other type of content. Objects may be created by users of the social networking system 140, such as status updates, photos tagged by users to be associated with other objects in the social networking system, events, groups or applications. In some embodiments, objects are received from third-party applications or third-party applications separate from the social networking system 140. Content "items" represent single pieces of content that are represented as objects in the social networking system 140. Users of the social networking system 140 are encouraged to communicate with each other by posting text and content items of various types of media through various communication channels, increasing the interaction of users with each other and increasing the frequency with which users interact within the social networking system.

The action logger 215 receives communications about user actions on and/or off the social networking system 140, populating the action log 220 with information about user actions. Such actions may include, for example, adding a connection to another user, sending a message to another user, uploading an image, reading a message from another user, viewing content associated with another user, attending an event posted by another user, among others. In some embodiments, the action logger 215 identifies interaction between a social networking system user and a brand page within the social networking system 140, which communicates targeting criteria associated with content on the brand page to a content selector to customize content from the brand page. In addition, a number of actions described in connection with other objects are directed at particular users, so these actions are associated with those users as well. These actions are stored in the action log 220.

The action log 220 may be used by the social networking system 140 to track user actions on the social networking system 140, as well as external website that communicate information to the social networking system 140. Users may interact with various objects on the social networking system 140, including commenting on posts, sharing links, and checking-in to physical locations via a mobile device, accessing content items or other interactions. Information describing these actions is stored in the action log 220. Additional examples of interactions with objects on the social networking system 140 included in the action log 220 include commenting on a photo album, communications between users, becoming a fan of a musician, adding an event to a calendar, joining a groups, becoming a fan of a brand page, creating an event, authorizing an application, using an application and engaging in a transaction. Additionally, the action log 220 records a user's interactions with advertisements on the social networking system 140 as well as other applications operating on the social networking system 140. In some embodiments, data from the action log 220 is used to infer interests or preferences of the user, augmenting the interests included in the user profile and allowing a more complete understanding of user preferences.

The action log 220 may also store user actions taken on external websites. For example, an e-commerce website that primarily sells sporting equipment at bargain prices may recognize a user of a social networking system 140 through social plug-ins that enable the e-commerce website to identify the user of the social networking system 140. Because users of the social networking system 140 are uniquely identifiable, e-commerce websites, such as this sporting equipment retailer, may use the information about these users as they visit their websites. The action log 220 records data about these users, including webpage viewing histories, advertisements that were engaged, purchases made, and other patterns from shopping and buying.

In one embodiment, an edge store 230 stores the information describing connections between users and other objects on the social networking system 140 in edge objects. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system, sharing a link with other users of the social networking system, and commenting on posts made by other users of the social networking system.

The edge store 230 stores edge objects that include information about the edge, such as affinity scores for objects, interests, and other users. Affinity scores may be computed by the social networking system 140 over time to approximate a user's affinity for an object, interest, and other users in the social networking system 140 based on the actions performed by the user. A user's affinity may be computed by the social networking system 140 over time to approximate a user's affinity for an object, interest, and other users in the social networking system 140 based on the actions performed by the user. Computation of affinity is further described in U.S. patent application Ser. No. 12/978,265, filed on Dec. 23, 2010, which is hereby incorporated by reference in its entirety. Multiple interactions between a user and a specific object may be stored in one edge object in the edge store 230, in one embodiment. In some embodiments, connections between users may be stored in the user profile store 205, or the user profile store 205 may access the edge store 230 to determine connections between users.

Data from the user profile store 205, the content store 210, the action log 220 and the edge store 230 associate with a user are referred to as narrative data for the user. A location may be associated with one or more items of narrative data. For example, a location where the social networking system 140 captured a particular user data or action is associated with the captured data or action. As additional examples, a location may be associated with narrative data based on user input or a location may indicate where a real world event described by narrative data occurred. Multiple locations may be associated with an item of narrative data. For example, a photograph of a user may be associated with the location at which the photograph was taken, as well as the location at which the photograph was uploaded to the social networking system 140. As another example, a connection associated with the user indicating a change of relationship status from single to married may be associated with multiple locations; one location may be the location at which that user was married and the other location may be the location at which the user's relationship status was changed on the social networking system 140.

The interface generator 235 generates one or more interfaces presenting information maintained by the social networking system 140 and allowing users to interact with the presented information. Various types of interfaces may be generated. For example, a timeline presenting a navigable chronological sequence of a user's information from one or more of the user profile store 205, the content store 210, the action log 220 and the edge store 230 is generated and presented to a user. Generation and presentation of a timeline is further described in U.S. patent application Ser. No. 13/239,345, filed on Sep. 21, 2011, U.S. patent application Ser. No. 13/239,347, filed on Sep. 21, 2011, U.S. patent application Ser. No. 13/239,348, filed on Sep. 21, 2011, and U.S. patent application Ser. No. 13/239,355, filed on Sep. 21, 2011, each of which is incorporated by reference herein in its entirety.

The interface generator 235 may also generate a map interface presenting items of narrative data, or "content items," by identifying a geographic location associated with a content item. For example, the map interface presents a map identifying various geographic locations and displays markers indicating geographic locations associated with content items. Interacting with a marker presents additional information about one or more content items associated with the geographic location identified by the marker. As further described below in conjunction with FIGS. 3A-6, the interface generator 235 may aggregate content items so that a marker is associated with multiple content items, allowing a user to more easily access content items via the map interface.

The web server 240 links the social networking system 140 via the network 120 to the one or more client devices 110, as well as to the one or more third party websites 130. The web server 240 serves web pages, as well as other web-related content, such as Java, Flash, XML and so forth. The web server 240 may provide the functionality of receiving and routing messages between the social networking system 140 and the client device 110, for example, instant messages, queued messages (e.g., email), text and SMS (short message service) messages, or messages sent using any other suitable messaging technique. A user may send a request to the web server 240 to upload information, for example, images or videos that are stored in the content store 210. Additionally, the web server 240 may provide API functionality to send data directly to native client device operating systems, such as IOS®, ANDROID™, WEBOS® or RIM.

Map Interface

As described above, the interface generator 235 generates a map interface presenting content items associated with a user by displaying markers on a geographical map that identify geographic locations associated with the content items. A description of the geographic data and/or the content item, or items, associated with the geographic location may be presented when a user interacts with a marker. For example, when a user places a cursor over a marker or clicks on a marker, a description of the geographic location or a description of an associated content item is presented.

A zoom level may be specified for the map interface, so modification of the zoom level modifies the scale of the geographic map. The zoom level may be modified or specified by a user or may be determined by the interface generator 235. Additionally, a user may navigate to various geographic locations via the map interface. For example, a user may scroll to a new geographic location on the geographical map presented by the map interface, or may center the geographical map on a new geographical location based on the geographical locations of the markers. The map interface may also include controls allowing a viewing user to manually zoom, pan, and rotate the geographical map.

Markers presented via the map interface may have different types based on the type of content items associated with the marker and/or the informational purpose of the marker. For example, distinct marker types may identify content items describing job changes, trips, weddings, birthdays, film viewings, etc. Some map markers may be designed for the purpose of displaying aggregate groups of data of various types. For example, there may be different types of markers for aggregating photos, videos, or music from a particular location (e.g., a photo report for a location). Other map markers may be used to identify different actions performed by social networking system users or types of connections made by the user. For example, a marker may indicate locations the user established a connection to another user having a specific type of connection.

Markers may identify any type of content item associated with a user. For example, information from a user profile, information describing an event or other suitable information associated with a geographic location may be associated with a marker presented on the geographic map. A user may also associate additional content items with an existing marker. For example, if the user modifies its user profile to indicate an employer, a marker associated with information about the employer may be used to identify the employer's geographical location; alternatively, a marker previously associated with the geographic location of the employer may be associated with the employer information.

A user may create a new map marker associated with a geographic location by selecting the geographic location from the geographic map presented by the map interface and identifying a content item or entering information associated with the selected geographic deadline. For example, when a user selects a geographic location using the map interface, the interface generator 235 opens a data entry interface and communicates data received via the data entry interface to one or more of the user profile store 205, the content store 210, the action log 220, or the event store 230. In addition, the interface generator 235 allows a user to change the geographic location associated with a content item. For example, a user may change the geographic location associated with a photograph posted by the user from the geographic location where the photograph was uploaded to the content store 210 to the location of an event at which the photograph was taken. Similarly, a user may associate a time with a content item or change a time associated with that item.

Display of certain content items via the map interface may be prevented by the interface generator 235. For example, a user's comment about a content item associated with an additional user may be excluded from the content items associated with a marker because of privacy settings in the user profile store 205 associated with the user. Additionally, the interface generator 235 accounts for privacy settings associated with a user viewing the map interface when determining which markers to present via the map interface. For example, a user associated with a content item associated with a marker may have one or more privacy settings preventing a specified user from viewing the content item; accordingly, a marker associated with the content item is not displayed to the specified user when the specified user accesses the map interface. Various privacy settings may allow a user to individually block additional users from viewing specific content items on an item-by-item basis, on a user-by-user basis, or based on groups of users. For example, a user may define a set of users as "co-workers" and block those users, as a group, from viewing photographs in which the user is tagged. Conversely, users or groups of users previously blocked from viewing content items may be given permission to view the content in a similar user-by-user basis, item-by-item basis, or based on groups of users.

Markers presented via the map interface may be filtered based on one or more criteria. For example, markers may be filtered based on geographic location or based on attributes of the content items associated with the markers. For example, markers may be filtered based on the time associated with content items associated with the markers, allowing a user to limit the displayed markers to those associated with a specific time or range of times. As another example, a user filters markers to limit the displayed markers to those associated with a specific type of content item; a user may limit presentation of markers to those associated with photographs or to those associated with content items associated with a specified third-party application. In another example, criteria may be specified to remove content items previously viewed by a user from being identified by the map interface, so that markers associated with unviewed narrative data are displayed. When filtering, statistics about the number content items satisfying the filtering criteria may be presented on the map interface along with the markers.

Content items may also be associated with one or more options allowing users to perform various functions, such as hiding the content item from the map interface or allowing the content item to appear on the map interface, visually distinguishing the content item from other content items on the map interface, etc. These functions may be performed on individual content items or on groups of content items based on geographic location, content item type, users associated with the content item, or any other suitable information.

In one embodiment, the map information presents content items associated with multiple users on a single geographic map. When content items associated with multiple users are indicated via the map interface, a user may filter the markers based on the users. The number of markers or content items associated with different users may be identified in some embodiments. Alternatively, the interface generator 235 generates markers associated with multiple users on a joint map interface by selecting content items related to all of the users. For example, markers identify photographs associated with all of a group of users, comment threads including comments by all of a group of users, events attended by all of a group of users, or any other content item associated with the entire group of users. Hence, the map interface identifies content items common to a group of users. For example, Jill elects to view a joint map interface to locate content items associated with for several of her classmates, Bob, Jim, and John. The interface generator 235 generates a map interface including markers associated with content items that are associated with all of Bob, Jim, and John. Displaying an intersection between users of a social networking system is disclosed in U.S. application Ser. No. 13/087,672, filed on Apr. 15, 2011, which is incorporated herein by reference in its entirety.

Users may customize presentation of their associated content items. For example a user may highlight associated content items it likes or may remove or hide associated content items it dislikes. For example, the interface generator 235 allows a user to hide or remove markers associated with selected content items from a map interface of the user's associated content items. As another example, content items may be highlighted by the user by visually distinguishing markers associated with the highlighted content items from markers associated with other content items on the map interface. Content items may be identified for emphasizing or hiding based on any suitable characteristic of the content items, such as content item type, associated user, geographic location, or any other suitable attribute. A user may be limited to personalizing content items displayed on a user-specific map interface or may be allowed to personalize their view of another user's map interface. In one embodiment, both the user associated with a map interface and the user viewing the map interface may personalize presentation of data via the map interface.

Figure 3A:
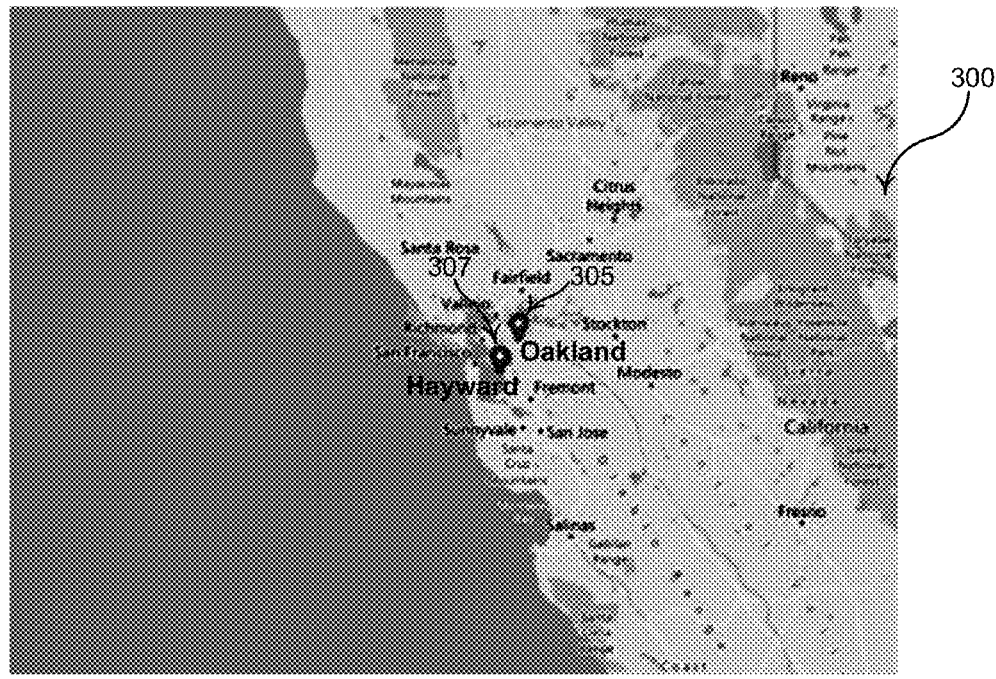
FIG. 3A is an example of presenting markers associated with geographic locations associated with content items on a map interface, in accordance with an embodiment of the invention.
Figure 3B:
FIG. 3B is an examples of presenting a marker indicating a geographic location associated with markers associated with geographic locations of content items on a map interface, in accordance with an embodiment of the invention.

Additionally, to simplify user interaction with the map interface, the interface generator 235 aggregates content items so that a single marker is associated with the aggregated content items. This reduces the number of markers displayed via the map interface without reducing the content items accessible via the map interface. FIG. 3A shows a map interface 300 displaying a first marker 305 identifying a geographic location associated with a content item and a second marker 307 identifying a different geographic location for an additional content item. FIG. 3B shows the map interface 300 with a single marker 310 identifying the content item and the additional content item. In FIG. 3B, the single marker 310 identifies the number of content items aggregated. In one embodiment, aggregation of content items depends in part on the zoom level used by the map interface. For example, content items associated with geographic locations within a threshold distance of each other are aggregated, and the threshold distance may depend in part on the zoom level. Hence, changing the zoom level of the map interface changes the aggregation of content items, allowing the number of markers displayed to vary as the zoom level is modified.

Content Item Aggregation

To aggregate content items, the interface generator 235 determines the zoom level used to view the map interface. Based on the zoom level, the interface generator 235 determines a threshold distance that is used to determine whether to aggregate content items. A plurality of distances between pairs of content items associated with geographic locations are determined based on the zoom level and a pair of content items associated with a shortest distance between their respective geographic locations are selected. If the distance between the selected pair of content items is less than or equal to the determined threshold distance, the interface generator 235 generates an aggregated content item by combining the selected pair of content items. Based on the geographic locations associated with the selected pair of content items, a geographic location associated with the aggregated content is determined. For example, a weighted average of the geographic locations associated with each of the selected pair of content items is used to determine the geographic location associated with the aggregated content item. Various information may be used to weight the geographic locations associated with the selected pair of content items. For example, weights associated with each of the geographic locations may be based on a time associated with each of the selected pair of content items or based on a viewing user's affinities for each of the selected pair of content items. Alternatively, the geographic location associated with the aggregated content item may be specified as the geographic midpoint between the geographic locations associated with the selected pair of content items.

In one embodiment, the interface generator 235 repeats the previous actions until the shortest distance between a pair of content items or between a pair of aggregated content items is less than the threshold distance. After generating aggregated content items, the interface generator 235 sends a map interface to a user for display that includes one or more markers identifying the geographic location associated with the aggregated content item. The map interface may also include additional markers associated with geographic locations of additional content items.

Hence, if the map interface is viewed at a zoom level making markers with distinct locations difficult to distinguish, content items associated with multiple markers are aggregated into an aggregated content item and a marker associated with the aggregated content item is displayed rather than the markers associated with each content item. In one embodiment, the marker presented for the aggregated content item includes a number indicating content items included in the aggregated content item. The size of the marker shown for the aggregated content item may be proportional to the number of content items included in the aggregated content items. If the map interface's zoom level is further decreased, multiple aggregated markers may similarly be combined into a single aggregated marker. If the zoom level of the map interface is increased, an aggregated content item is resolved into its constituent content items. Markers identifying the geographic locations of the constituent content items are then presented via the map interface. Aggregation of content items is further described below in conjunction with FIGS. 4A-5.

Figure 4A:
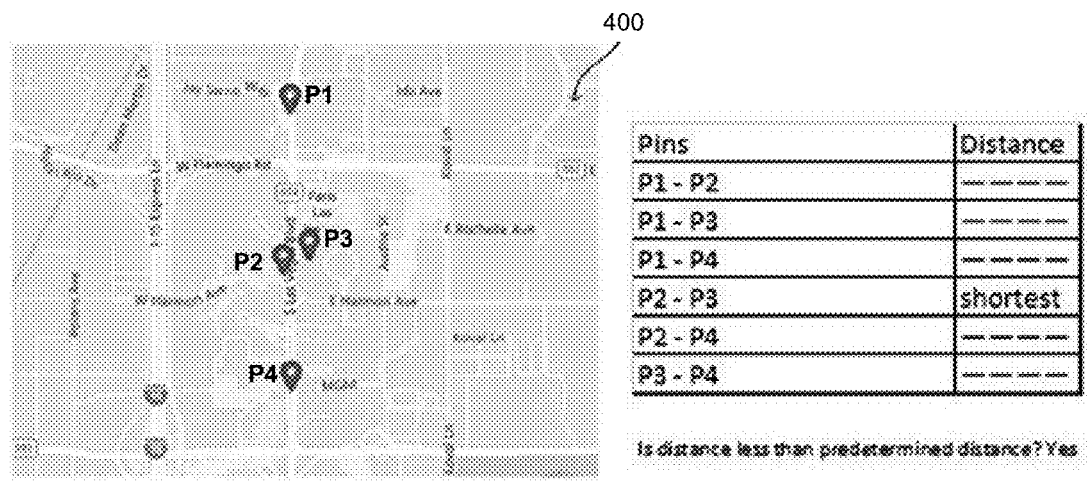
FIGS. 4A and 4B illustrate a method for generating an aggregated content item and associating a geographic location with the aggregated content item, in accordance with an embodiment of the invention.
Figure 4B:
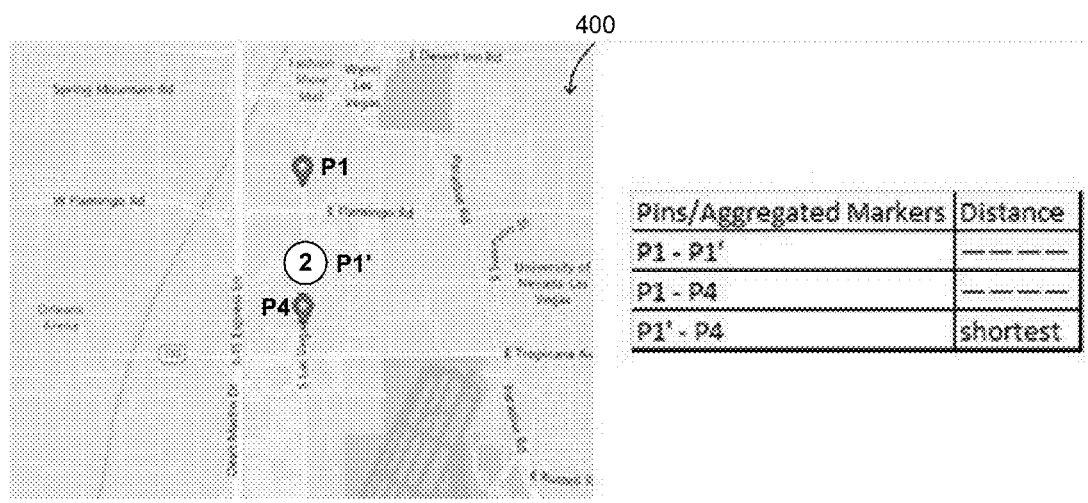

FIGS. 4A and 4B illustrate a method for aggregating content items, in accordance with an embodiment of the invention. FIG. 4A shows a map interface 400 including multiple markers P1, P2, P3, P4, each identifying a geographic location associated with a content item. In the example of FIG. 4A, markers P2 and P3 are associated with geographic locations that are the closest together. The interface generator 235 identifies that markers P2 and P3 are the pair of markers associated with the geographic locations that are closest together and compares the distance between the geographic locations associated with markers P2 and P3 with a threshold distance that is based in part on the zoom level of the map interface. If the distance between the geographic locations associated with markers P2 and P3 is less than or equal to the threshold distance, content items associated with markers P2 and P3 are aggregated, and marker P1', as shown in FIG. 4B, is used to identify a geographic location associated with the aggregated content item. In the example of FIG. 4B, marker P1' includes the number "2," indicating that two content items were aggregated and to signify that marker P1' identifies multiple content items.

In one embodiment, the threshold distance used by the interface generator 235 is inversely proportional to the zoom level. For example, if the zoom level is low (e.g., an entire country is being displayed), the threshold distance is very large, while if the zoom level is high (e.g., only a neighborhood is displayed), the threshold distance is very small. As described above, if the geographic distance associated with a pair of content items is less than or equal to the threshold distance, the content items are aggregated into an aggregated content item. A geographic location is associated with the aggregated content item based on the geographic locations of the content items being aggregated. Various factors may be used to determine the geographic location associated with the aggregated content item. Examples of factors for determining the location associated with an aggregated content item include: geographic midpoint between the geographic locations associated with the content items being aggregated, time, the number of items associated with the markers that have been aggregated, etc.

For example, the location associated with an aggregated content item may be based on a weighted average of the number of content items being aggregated associated with different geographic locations (e.g., several photos taken at a restaurant and one photo taken at a nearby park could be gathered into one aggregated marker located between the locations and closer to the restaurant since more photos were taken there). As an additional example, the geographic location of the aggregated content item may be determined by user affinity and/or a normalization process, which is described in more detail herein. If the geographic distance between a pair of content items exceeds threshold distance, no aggregation occurs.

In FIG. 4B, Marker P1' is associated with a geographic location that is based on the geographic locations associated with markers P2 and P3. For example, marker P1' is associated with geographic location determined from the geographic location associated with marker P2 and the geographic location associated with marker P3. After generating the aggregated content item, the interface generator 235 determines distances between the geographic locations associated with pairs of markers P1, P1' and P4. The distances between the geographic locations associated with the various pairs are compared to the threshold distance, as described above. In the example of FIG. 4B, the shortest distance between geographic locations is between markers P1' and P4, but the distance between the geographic locations associated with P1' and P4 is greater than the threshold distance, no content items are aggregated and the map interface is sent for presentation to a user for presentation including makers P1, P1', P4.

In another embodiment, content items are analyzed for aggregation based on times associated with the content items, the number of content items included in aggregated content items, user affinity for content items, or any other suitable factors. For example, if a map interface includes two markers associated with photos taken the previous day and five additional markers associated with comments and/or status updates entered the previous month, the content items associated with the most recent times may be identified and the geographic distance between the most recent content items is determined and compared to the threshold distance. If the distance between the geographic locations associated with the most recent content items is less than or equal to the threshold distance, the content items are aggregated. In one embodiment, if the geographic distance between the most recent content items exceeds the threshold distance, the distance between geographic locations associated with pairs of content items is repeated for the additional content items in reverse chronological order.

Displaying Information Associated with an Aggregated Content Item

Interacting with markers displayed on the map interface allows a user viewing the map interface to access information about the content items associated with the markers. When a user viewing the map interface interacts with a marker associated with an aggregated content item, information about the content items combined to generate the aggregated content item is presented. For example, clicking on a marker associated with an aggregated content item causes the map interface to display information about the aggregated content items, such as the location associated with the aggregated content item and content selected from the content items that were aggregated.

Figure 5:
FIG. 5 is an example of an information display presenting information about content items that comprise an aggregated content item via a map interface, in accordance with an embodiment of the invention.

Interacting with a marker displayed by the map interface that identifies an aggregated content item including content items from different geographic locations presents a set of content from the content items that were aggregated to a user. FIG. 5 illustrates one embodiment of presenting content from an aggregated content item to a viewing user. In FIG. 5, a map interface 500 includes a marker 510 that identifies an aggregated content item that includes four content items. When a user interacts with the marker 510 identifying the aggregated content item, an information display 515 is presented. The information display 515 includes content 517 retrieved from the content items combined to form the aggregated content item. In the example of FIG. 5, three content items are retrieved from the content items combined to form the aggregated content item and are presented in the information display 515. The information display 515 for the aggregated content item may include similar information as an information display for a content item. In one embodiment, the information display 515 for the aggregated content item includes less detail than an information display for a content item. For example, if three content items associated with three cities that are geographically close are aggregated, the information display 515 for the aggregated content item indicate the number of visits to places without further details. The information display 515 may also include a location identifier 519. In one embodiment, the location identifier 510 is the geographic location associated with the aggregated content item.

Figure 6:
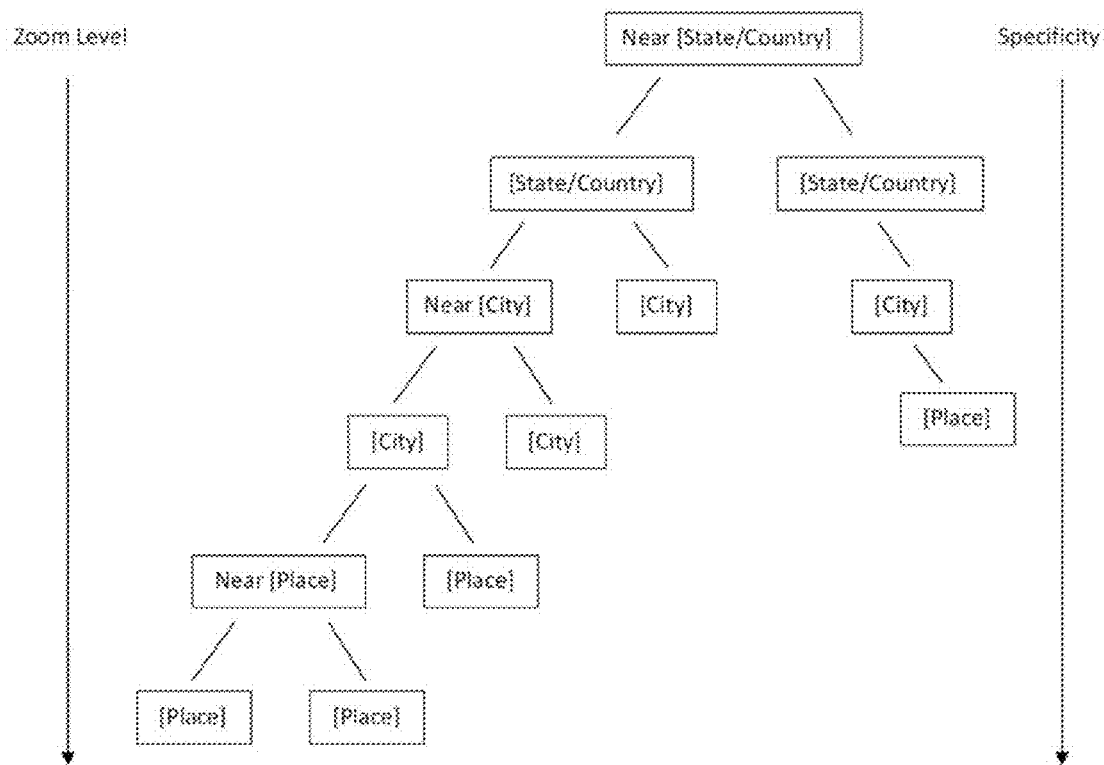
FIG. 6 is an example of a location hierarchy for display in an information display to describe a location associated with an aggregated content item, in accordance with an embodiment of the invention.

The location identifier 519 of the information display 515 may depend on the zoom level and identify the location associated with the aggregated content item with a level of detail that is proportional to the zoom level. In one embodiment, when increasing the zoom level, the location identifier 519 may increase the precision with which the location is identified. For example, increasing the zoom level of the map interface 500 modifies the location identifier 519 from country to state to city to place. FIG. 6 is a diagram of the types of location identifiers 519 that may be presented to users, in accordance with an embodiment of the invention. The location identifier 519 shown at different zoom levels may indicate a precise location or an approximate location. For example, if there are content items markers within San Francisco and one content item near San Francisco, but outside the city boundaries, the location label associated with the aggregated content item identifies "Near San Francisco, Calif.," rather than "San Francisco, Calif." Choosing the name of the approximate location may depend on times associated with content items, the number of content items associated with geographic locations that have been aggregated, user for content items that have been aggregated, or any other suitable information.

Alternatively, the location identifier 519 may be independent of the zoom level and identify a geographic location with the highest degree of specificity possible. For example, at a zoom level corresponding to displaying states the state level, rather than identifying a city with the location identifier 510, if an aggregated content item includes content items all associated with the same theme park, the theme park is identified by the location identifier 510. In another embodiment, the location identifier 519 has a maximum specificity level when zoom level is at its lowest level and a minimum specificity level when the zoom level is at its highest level.

The content 517 presented in the information display 515 for a marker associated with an aggregated content item summarizes the content items included in the aggregated content item. Accordingly, a subset of the content included in the aggregated content items is displayed. For example, the information display 515 is limited to presenting a specified amount of content 517. The content 517 is generated from the most relevant or interesting narrative data in order to present a viewing user with information likely to be of interest to the viewing user. For example, a marker identifies an aggregated content item including various photographs, so the content 517 shown by the information display 515 includes thumbnails of the three most popular photos in the photo album, and may also indicates the number of photographs in the aggregated content item. The content 517 may be selected based on the viewing user's affinities for content items in the aggregated content item, so that the content items for which the user has the highest affinity are presented as the content 517 of the information display 515.

In another embodiment, the information display 515 may include content items randomly selected from the aggregated content item. The information display 515 may also display a given number of content items along with a scroll bar to allow a viewing user to scroll between multiple content items used to generate an aggregated content item. In another embodiment, the information display 515 includes user interface elements allowing a viewing user to comment on, express a preference for, or otherwise interact with content items included in the information display 515.

Navigation aids may be included in the content 517, allowing a user viewing the content to easily obtain more information about specific content items. Examples of navigation aids include web links, tabs, buttons, or other suitable interface elements. The content 517 in the information display 515 may itself be a navigation aid. For example, the content 517 may include a set of thumbnails representing images from a content item such as a photo album, allowing a user to navigate the content item by accessing the thumbnails.

In one embodiment, the content 519 presented by the information display 515 is presented based on a ranking based in part on the user viewing the information display 515. Alternatively, the ranking is based on characteristics of the user associated with the content items that were aggregated. In another embodiment, the user associated with the content items, or the viewing user, may specify preferences or settings that are used to select the content 519 presented by the information display 515. For example, if Bob is viewing a map interface including content items associated with Jim, the social networking system may give Bob the ability to hide and show items on the map interface. Bob's interactions with the content items may be subsequently used to provide Bob with Jim's map interface identifying content items based on Bob's prior interactions.

In another embodiment, the content 519 of the information display 515 is selected using a diversification process where a certain number of each type of content item type are selected. Another diversification process negatively weights content items of a particular type once a specified number of content items having the same time have been displayed. Diversification may be varied based on the demographic of the viewing user, the user associated with the content items, or both.

A de-duplication process may also be used when selecting the content 519 of the information display 515. The de-duplication process removes duplicate content items from the content 519 presented for an aggregated content item. For example, if the interface generator 235 detects two content items containing the same type of information in an aggregated content item, one of the duplicate content items is removed, such as the content item for which the viewing user has the lowest affinity. This reduces the likelihood of the same content 519 from being displayed multiple times in an information window 515. As another example, if two content items including the same information are identified, the duplicate information is removed from one of the content items, such as the content item for which the viewing user has the lowest affinity. This may involve additional to determine if the removal of the duplicated narrative data renders content uninteresting to the viewing user or invalid. For example, if a content item includes only a single photo and a comment referring to that photo, removing the comment may not make the item uninteresting, since users may enjoy looking at single photos even without comments. However, if the duplicated material is the photo, then the removal of the photo may render the content item uninteresting, as a comment referring to the photo is not interesting without the photo itself.

The content 519 and ordering of content 517 in the information display 515 may be modified in real-time as more information is obtained by the social networking system 140. A ranking process may be used by the interface generator 235 determine the content 517 from an aggregated content item most likely to be of interest to a viewing user based on the viewing user's affinity for the content items that were aggregated. As an additional example, interactions by other social networking system users may be used to select the content 517. For example, content 517 may be photographs selected from the aggregate content item based on the number of photo views, comments, likes, etc. The ranking may account for the recency of content items in an aggregated content item to increase the likelihood that more recent content is selected. Any other method, or combination of methods, may be used to select the content 517. The order of the presented content 519 may be based on prior interactions with content items by the viewing user and/or prior interactions with content items by the user associated with the content items. Additional information, such as social signals, recent views, or other information may also be used to determine the order of the content 517 by ranking the content 517 The ranking may be used to visually distinguish certain content 517, such as highly ranked content 517 or content 517 having at least a threshold rank.

As described above, content from an aggregated content item may be ranked to determine the order in which it is presented in the information display 515. The ranking may be random or non-random. For example, the order in which the items are displayed may randomly change each time a viewing user interacts with a marker associated with an aggregated content item the order may remain consistent based on a number of factors including user preferences, affinity, etc.

The social networking system may compute a measure of a viewing user's affinity for other users (or objects) in the social networking system and use the affinities to rank content 517 from an aggregated content item. The measure of affinity may be expressed as an affinity score representing the viewing user's closeness to a user (or object) of the social networking system. The affinity score of a viewing user for another user can be used to predict, for example, if the viewing user would be interested in viewing or likely to view a photo of the other user. Affinity scores can be computed by the social networking system 140 through automated methods, including through predictor functions, machine-learned algorithms, or any other suitable algorithm for determining user affinities. An archive of historical affinity scores for a user may be stored and associated with the user as a user's affinity scores for various users and objects changes over time. Computing user affinities for other users of a social networking system, as well as for other objects in the system, are disclosed in U.S. application Ser. No. 12/978,265, filed on Dec. 23, 2010, which is incorporated herein by reference in its entirety. In another embodiment, the affinity scores of the subject user, instead of the viewing user, or a combination of the two, are used to determine the relevance of the narrative data. Additional information, such as the number of users viewing, sharing, expressing a preference for, or otherwise interacting with content items in an aggregated content item may also be used to generate a ranking.

To provide a uniform ranking including different types of content, scores may be normalized scores across different content types. The normalization process can be used to weight certain content types to increase or decrease their rank. For example, the social networking system 140 may, because viewers often prefer photos over text, give additional weight to content including photos while reducing the weight of content predominantly including text. The weights and the details of the normalization process may be adjusted based on the needs of the social networking system 140. For example, the normalization process may be configured for a particular user or a specific demographic to account for tastes and preferences. In order to determine a weight for each content type, the social networking system 140 may look at various features and social data signals associated with these content types. These features and signals include user "likes," user comments, user views, user affinity, etc., and may also include features from the underlying narrative data included in these content types. Once the content items are normalized, the social networking system 140 creates a ranking based on the normalized scores.

In one embodiment, when the interface generator 235 orders content 517 for presentation in the information display 515 for an aggregated content item a diversification process is implemented so that different types of content 517 are selected. This reduces the likelihood that the information display 515 presents a single type of content 517. For example, without a diversification process, it is possible that the top three content items for an aggregated content item are all images. To prevent such an outcome, the interface generator 235 may limit the information display 515 to presenting a specified amount of content 519 having various types or may positively bias content types that are underrepresented at the top of the ranking and negatively bias content types that are overrepresented at the top of the ranking. Diversification may be varied based on the demographic of the viewing user, the subject user, or both.

In one embodiment, the interface generator 235 allows users to select particular "views" of the information display 515 that are biased to show more of one type of content, or exclusively one type of content. For example, scores of particular types of content are weighted higher, based on a user preference, to increase the likelihood of the particular type of content that is displayed. For example, if a user selects a "Photos" view of the information display 515 the interface generator 235 may score content including photographs much higher than other types of content so that predominantly items with photographs are displayed in the information display 515.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described. Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
aggregating, by a social networking system, a plurality of content items to generate an aggregated content item for presenting via a map interface to a viewing user, each of the plurality of content items associated with a user of the social networking system connected to the viewing user via the social networking system, each of the plurality of content items associated with a geographic location;
determining an aggregated geographic location based on the plurality of content items, the aggregated geographic location determined as an aggregated value based on the geographic locations associated with each of the plurality of content items;

generating a map interface for presenting to a viewing user, the map interface identifying the aggregated geographic location associated with the aggregated content item on a geographic map;

selecting a representative content item from the aggregated content item for generating an information display for presentation in association with the aggregated geographic location, the selecting comprising:

retrieving two or more content items included in the aggregated content item;

for each of the retrieved two or more content items, determining a measure of affinity of the viewing user towards another user of the social networking system associated with each of the two or more content items;

ranking the retrieved two or more content items based on one or more criteria, the one or more criteria comprising, for each of the two or more content items, the determined measure of affinity of the viewing user toward the other user associated with each of the two or more content items; and selecting the representative content item from the retrieved two or more content items based at least in part on the ranking;

generating the information display associated with the aggregated content item, the information display based on the representative content item; and sending the information display for presentation to the viewing user in association with the aggregated geographic location.

2. The method of claim 1, wherein the aggregated content item comprises
content items for which the viewing user has the highest determined affinities.

3. The method of claim 1, wherein ranking the retrieved two or more content items based on one or more criteria comprises:
determining a time associated with each of the retrieved two or more content items; and
selecting the two or more content items based at least in part on the determined times.

4. The method of claim 1, wherein aggregating the plurality of content items comprises:
selecting the plurality of content items to include a specified amount of content items having a particular content type.

5. The method of claim 1, wherein the aggregated geographic location associated with the aggregated content item is based at least in part on a zoom level used to present the map interface to the viewing user.

6. The method of claim 5, wherein the aggregated geographic location associated with the aggregated content item includes a level of information proportional to the zoom level.

7. The method of claim 1, wherein the representative content item is a first representative content item, the method further comprising:
responsive to the social networking system receiving a more recent interaction from another user associated with the content items of the aggregated content item, determining a second representative content item for the information display; and
modifying the information display associated with the aggregated content item to comprise information based on the second representative item.

8. The method of claim 1, wherein the measure of affinity is an affinity score representing a closeness of the viewing user towards another user.

9. The method of claim 1, wherein the information display comprises a plurality of representative content items.

10. The method of claim 9, wherein each content item has a content type and the plurality of representative content items is selected so as to diversify the content types of content items included in the information display, the diversifying causing the plurality of representative content items to include at least a first content item of a first content type and a second content item of a second content type.

11. The method of claim 10, wherein diversifying of the content types of content items included in the information display comprises positively biasing content items of content types determined to be underrepresented in a ranked list of content items.

12. The method of claim 10, wherein diversifying of the content types of content items included in the information display comprises negatively biasing content items of content types determined to be overrepresented in a ranked list of content items.

13. The method of claim 9, further comprising:
determining the aggregate value based on the plurality of representative content items for including in the information display.

14. The method of claim 1, further comprising:
receiving, from the viewing user, a change in a preference associated with another user associated with a content item from the aggregated content item; and
modifying the representative content item associated with the aggregated content item for the information display in accordance with the change in preference.

15. The method of claim 1, further comprising:
receiving, from the viewing user, a filtering criteria for identifying a set of users of the social networking system; and
wherein the generated map interface comprises one or more aggregated geographic locations, each of the one or more aggregated geographic location associated with a user from the set of users.

16. A non-transitory computer readable storage medium storing instructions for:
aggregating, by a social networking system, a plurality of content items to generate an aggregated content item for presenting via a map interface to a viewing user, each of the plurality of content items associated with a user of the social networking system connected to the viewing user via the social networking system, each of the plurality of content items associated with a geographic location;

determining an aggregated geographic location based on the plurality of content items, the aggregated geographic location determined as an aggregated value based on the locations associated with each of the plurality of content items;

generating a map interface for presenting to a viewing user, the map interface identifying the aggregated geographic location associated with the aggregated content item on a geographic map;

selecting a representative content item from the aggregated content item for generating an information display for presentation in association with the aggregated geographic location, the selecting comprising:
retrieving two or more content items included in the aggregated content item;

for each of the two or more content items, determining a measure of affinity of the viewing user towards another user of the social networking system associated with each of the two or more content items;

ranking the retrieved two or more content items based on one or more criteria, the one or more criteria comprising, for each of the two or more content items, the determined measure of affinity of the viewing user toward the other user associated with each of the two or more content items; and selecting the representative content item from the retrieved two or more content items based at least in part on the ranking;

generating the information display associated with the aggregated content item, the information display based on the representative content item; and sending the information display for presentation to the viewing user in association with the aggregated geographic location.

17. The non-transitory computer readable storage medium of claim 16, wherein the representative content item is a first representative content item, the non-transitory computer readable storage medium further storing instructions for:

responsive to the social networking system receiving a more recent interaction from another user associated with the content items of the aggregated content item, determining a second representative content item for the information display; and modifying the information display associated with the aggregated content item to comprise information based on the second representative item.

18. The non-transitory computer readable storage medium of claim 16, wherein the information display comprises a plurality of representative content items, and wherein each content item has a content type and the plurality of representative content items is selected so as to diversify the content types of content items included in the information display, the diversifying causing the plurality of representative content items to include at least a first content item of a first content type and a second content item of a second content type.

19. The non-transitory computer readable storage medium of claim 18, wherein diversifying of the content types of content items included in the information display comprises one or more of:

positively biasing content items of content types determined to be underrepresented in a ranked list of content items; and negatively biasing content items of content types determined to be overrepresented in a ranked list of content items.

20. The method of claim 1, wherein the aggregated geographic location for the aggregated content item is determined as a weighted average of the geographic locations of the content items associated with the aggregated content item, wherein the weighted average weighs a geographic location based on an affinity of the viewing user with the content item associated with the geographic location.

21. The method of claim 20, wherein the aggregated geographic location for the aggregated content item is determined as the weighted average of the geographic locations of the content items associated with the aggregated content item, wherein a weight associated with a geographic location of a content item is based at least in part on a time associated with the content item.

22. The non-transitory computer readable storage medium of claim 16, wherein the aggregated geographic location for the aggregated content item is determined as a weighted average of the geographic locations of the content items associated with the aggregated content item, wherein the weighted average weighs a geographic location based on an affinity of the viewing user with the content item associated with the geographic location.

23. The non-transitory computer readable storage medium of claim 22, wherein the aggregated geographic location for the aggregated content item is determined as the weighted average of the geographic locations of the content items associated with the aggregated content item, wherein a weight associated with a geographic location of a content item is based at least in part on a time associated with the content item.

* * * * *